(12) United States Patent
Wang (10) Patent No.: US 12,468,680 B2
(45) Date of Patent: Nov. 11, 2025

(54) METHOD FOR CONTROLLING TRANSACTION CONCURRENCY, ELECTRONIC DEVICE, AND READABLE STORAGE MEDIUM

(71) Applicant: SHENZHEN ZOLON TECHNOLOGY CO., LTD., Shenzhen (CN)

(72) Inventor: Jian Wang, Shenzhen (CN)

(73) Assignee: SHENZHEN ZOLON TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/725,727

(22) PCT Filed: Oct. 18, 2022

(86) PCT No.: PCT/CN2022/125971
§ 371 (c)(1),
(2) Date: Jun. 28, 2024

(87) PCT Pub. No.: WO2023/124421
PCT Pub. Date: Jul. 6, 2023

(65) Prior Publication Data
US 2025/0068618 A1    Feb. 27, 2025

(30) Foreign Application Priority Data
Dec. 31, 2021    (CN) .......................... 202111679155.9

(51) Int. Cl.
*G06F 7/00*    (2006.01)
*G06F 16/23*    (2019.01)

(52) U.S. Cl.
CPC ...... *G06F 16/2343* (2019.01); *G06F 16/2379* (2019.01)

(58) Field of Classification Search
CPC .......................... G06F 16/2343; G06F 16/2379
USPC .................................................. 707/600–899
See application file for complete search history.

(56) References Cited

U.S. PATENT DOCUMENTS

2010/0191884 A1*    7/2010    Holenstein .......... G06F 16/2343
                                                              707/613

* cited by examiner

*Primary Examiner* — Isaac M Woo
(74) *Attorney, Agent, or Firm* — ScienBiziP, P.C.

(57) ABSTRACT

A method for controlling transaction concurrency implemented in an electronic device includes: obtaining a read operation for a target record; in response to the read operation, obtaining record header data of the target record; in response that the target record is in a valid state according to the state information, the target record is not deleted according to the record lock information, the deletion version number is null, and the creation version number is not equal to the unique identifier of the first transaction, determining whether the creation version number is in a transaction registration list; when the creation version number is not in the transaction registration list, reading the target record; and when the creation version number is in the transaction registration list, determining that the target record is unreadable to the first transaction.

20 Claims, 4 Drawing Sheets

METHOD FOR CONTROLLING TRANSACTION CONCURRENCY, ELECTRONIC DEVICE, AND READABLE STORAGE MEDIUM

CROSS-REFERENCE

This application claims priority of Chinese Patent Application No. 202111679155.9, filed on Dec. 31, 2021 in the China National Intellectual Property Administration (CNIPA), the entire contents of which are incorporated by reference herein.

FIELD

The subject matter herein generally relates to a technical field of databases, and particularly to a method and a device for controlling transaction concurrency, an electronic device, and a computer readable storage medium.

BACKGROUND

In a technical field of databases, a transaction is a sequence of database operations, for example, a transaction includes a record creation operation and a record deletion operation.

The transactions have ACID properties. A (Atomicity): all operations in the transactions either succeed or fail, and there can be no partial effect or partial loss; C (Consistency): The operation of the transactions does not change the original consistency constraint of the databases, and the transactions change the databases from one consistent state to another consistent state; I (Isolation): the isolation means that concurrent transactions do not affect each other, for example, the data to be accessed by a transaction is being modified by another transaction, as long as the other transaction has not committed, the data it accesses is not affected by the uncommitted transaction; D (Durability): data is permanent once committed.

A number of transactions can be concurrent, and concurrent transactions may cause dirty read problems.

SUMMARY

Technical Problem

A method and a device for controlling transaction concurrency, an electronic device, and a computer readable storage medium are provided for transaction concurrency control of databases and transaction isolation level of Read Commit, there is no dirty read problem.

Solution to the Technical Problem

Technical Solution

In a first aspect, a method for controlling transaction concurrency is provided, the method includes:
 obtaining a read operation for a target record, the read operation belonging to a first transaction, and the target record being a record created by a second transaction;
 in response to the read operation, obtaining record header data of the target record, the record header data including record lock information, state information, a creation version number, and a deletion version number, the record lock information being used to represent whether the target record is deleted, the state information being used to represent whether the target record is valid, the creation version number being used to represent a unique identifier of a transaction that creates the target record, and the deletion version number being used to represent a unique identifier of a transaction that deletes the target record;
 in response that the target record is determined to be in a valid state according to the state information, the target record is determined to be not deleted according to the record lock information, the deletion version number is null, and the creation version number is not equal to the unique identifier of the first transaction, determining whether the creation version number is in a transaction registration list;
 in response that the creation version number is not in the transaction registration list, reading the target record; and
 in response that the creation version number is in the transaction registration list, determining that the target record is unreadable to the first transaction.

In the embodiment of the present disclosure, based on the record lock information, state information, creation version number, and deletion version number in the record header data, when the target record is determined to be in a valid state, has not been deleted and the deletion version number is null, and it is further determined whether the creation version number is in the transaction registration list. When the creation version number is in the transaction registration list, it indicates that the second transaction has not been committed, and the target record is unreadable to the first transaction. When the creation version number is not in the transaction registration list, it indicates that the second transaction has been committed, and the target record is readable to the first transaction, then the first transaction can read the target record. In this way, transaction concurrency control of the database is implemented, and the transaction isolation level of the read committed level is implemented, and the dirty read problem cannot occur.

In some implementations of the first aspect, after obtaining the record header data of the target record, the method further includes:
 in response that the target record is determined to be in the valid state according to the state information, the target record is determined to be deleted according to the record lock information, the deletion version number is not null, and the deletion version number is not equal to the unique identifier of the first transaction, determining whether the creation version number and the deletion version number are in the transaction registration list;
 in response that the creation version number is not in the transaction registration list and the deletion version number is in the transaction list, reading the target record; and
 in response that the creation version number is not in the transaction registration list and the deletion version number is not in the transaction list, determining that the target record is unreadable to the first transaction.

In some implementations of the first aspect, after obtaining the record header data of the target record, the method further includes:
 in response that the target record is determined to be in an invalid state according to the state information, and the target record is determined to be deleted according to the record lock information, determining that the target record is unreadable to the first transaction; and
 in response that the target record is determined to be in the valid state according to the state information, the target record is deleted according to the record lock information, the deletion version number is not null, and the deletion version number is equal to the unique identifier of the first transaction, determining that the target record is unreadable to the first transaction.

In some implementations of the first aspect, before obtaining a read operation for a target record, the method further includes:

obtaining a deletion operation for the target record, the deletion operation belonging to the first transaction;

after reading the target record, the method further includes:

in response that the record lock information is a first value, and the deletion version number is null, in response to the deletion operation, changing the record lock information from the first value to a second value, and setting the deletion version number as a unique identifier of the first transaction;

after the first transaction commits the deletion operation, deleting the information of the first transaction from the transaction registration list, deleting the target record from a physical storage space, and changing the state information from a third value to a fourth value;

the first value indicating that the target record has not been deleted, the second value indicating that the target record has been deleted, the third value indicating that the target record is in the valid state, and the fourth value indicating that the target record is in an invalid state.

In some implementations of the first aspect, after obtaining the deletion operation for the target record, the method further includes:

in response that the record lock information is the second value, and the deletion version number is not null, in response to the deletion operation, determining that the target record is undeletable for the first transaction.

In some implementations of the first aspect, the method further includes:

obtaining a creation operation of the second transaction, the creation operation being used to create the target record;

in response to the creation operation, setting the record lock information to the first value, setting the state information to the third value, and setting the creation version number to the unique identifier of the second transaction.

In some implementations of the first aspect, after deleting the information of the first transaction from the transaction registration list, deleting the target record from the physical storage space, and changing the state information from the third value to the fourth value, the method further includes:

obtaining a rollback operation of the first transaction;

in response to the rollback operation, obtaining undo log data of the first transaction;

according to the undo log data, setting the record lock information to the first value, clearing the deletion version number, setting the state information to the third value, setting the creation version number to the unique identifier of the second transaction, and restoring the target record.

In a second aspect, a device for controlling transaction concurrency is provided, the device includes:

an obtaining module, configured to obtain a read operation for a target record, the read operation belonging to a first transaction, and the target record being a record created by a second transaction;

a record header data obtaining module, configured to in response to the read operation, obtain record header data of the target record, the record header data including record lock information, state information, a creation version number, and a deletion version number, the record lock information being used to represent whether the target record is deleted, the state information being used to represent whether the target record is valid, the creation version number being used to represent a unique identifier of a transaction that creates the target record, and the deletion version number being used to represent a unique identifier of a transaction that deletes the target record;

a judging module, configured to in response that the target record is determined to be in a valid state according to the state information, the target record is determined to be not deleted according to the record lock information, the deletion version number is null, and the creation version number is not equal to the unique identifier of the first transaction, determine whether the creation version number is in a transaction registration list;

a reading module, configured to in response that the creation version number is not in the transaction registration list, read the target record; and a determining module, configured to in response that the creation version number is in the transaction registration list, determine that the target record is unreadable to the first transaction.

In a third aspect, an electronic device is provided, the electronic device includes: a storage device, a processor, and a computer program stored in the storage device and executable by the processor, wherein the processor implements the above-mentioned method when executing the computer program.

In a fourth aspect, a computer-readable storage medium storing a computer program is provided, the computer program implements the above-mentioned method when executed by a processor.

In a fifth aspect, a computer program product is provided, when the computer program product is run on an electronic device, the electronic device performs the above-mentioned method.

It can be understood that the beneficial effects of the second to fifth aspects mentioned above can be found in the relevant description of the first aspect mentioned above, and is not repeated.

BRIEF DESCRIPTION OF THE DRAWINGS

In order to more clearly state the technical solution in the embodiment of the present disclosure or the prior art, the following is a brief introduction of the drawings required to be used in the description of the embodiment or the prior art, it is obvious that the drawings described below are only some embodiments of the present disclosure, for those skilled in the art, other drawings can also be obtained from these drawings without creative efforts.

DETAILED DESCRIPTION

Embodiments of the Present Disclosure

In the following description, specific details such as specific system structures, technologies, etc. are provided for the purpose of illustration rather than limitation, so as to provide a thorough understanding of the embodiments of the present disclosure. However, it should be clear to those skilled in the art that, the present disclosure may also be implemented in other embodiments without these specific details. In other cases, detailed descriptions of well-known systems, devices, circuits, and methods are omitted to prevent unnecessary details from obstructing the description of the present disclosure.

It should be understood that when used in the present specification and the appended claims, the term "comprise" indicates the presence of described features, wholes, steps, operations, elements, and/or components, but does not exclude the presence or addition of one or more other features, wholes, steps, operations, elements, components, and/or combinations thereof.

It should also be understood that, the term "and/or" used in the specification and the appended claims refers to any and all possible combinations of one or more of the associated listed items, and includes these combinations.

As used in the specification and appended claims of the present disclosure, the term "if" can be interpreted as "when" or "once" or "in response to determining" or "in response to detecting" depending on the context. Similarly, the phrase "if it is determined" or "if it is detected that (e.g., the described condition or event)" can be interpreted as "once determined" or "in response to determining" or "once detected (e.g., the described condition or event)" or "in response to detecting (e.g., the described condition or event)" depending on the context.

In addition, in the specification of the present disclosure and the appended claims, the terms "first", "second", "third", etc. are only used to distinguish the descriptions and cannot be understood as indicating or implying relative importance.

References to "one embodiment" or "some embodiments" etc. described in the specification of the present disclosure mean that one or more embodiments of the present disclosure include specific features, structures, or characteristics described in conjunction with the embodiment. Therefore, the statements "in one embodiment", "in some embodiments", "in other embodiments", "in another embodiment", etc. that appear in different positions in this specification do not necessarily refer to the same embodiment, but mean "one or more but not all embodiments", unless otherwise in detail emphasized in other ways. The terms "include", "comprise", "have" and their variations all mean "include but is not limited to", unless otherwise in detail emphasized in other ways.

Figure 1:
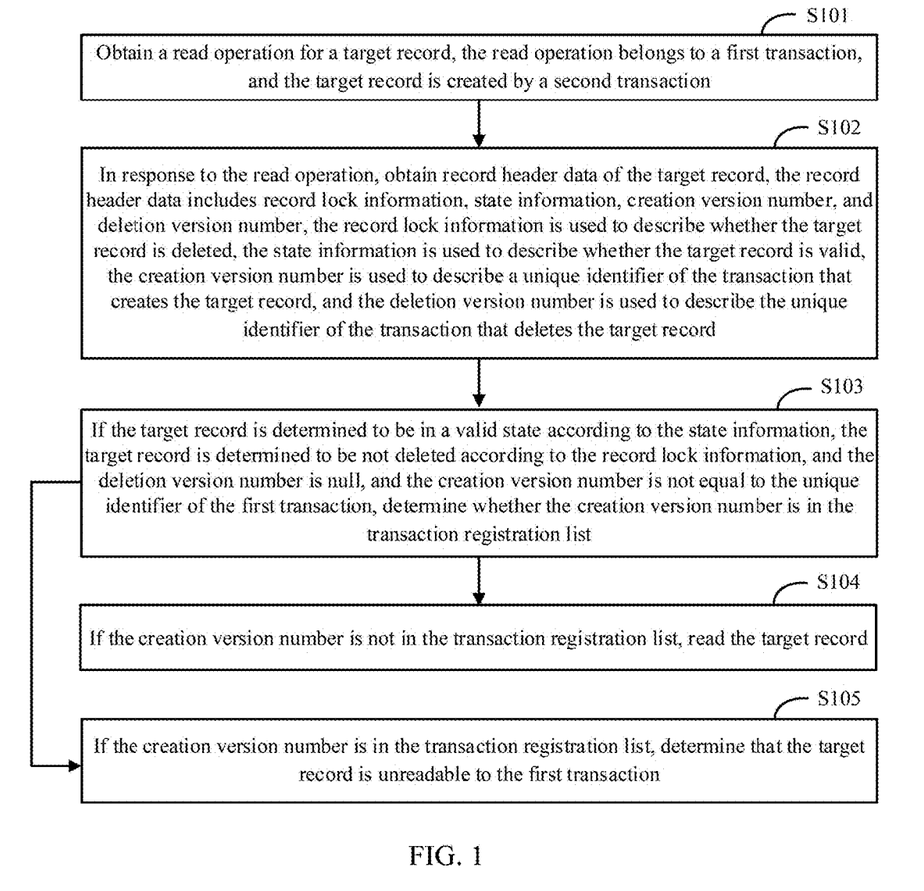
FIG. 1 is a flowchart of an embodiment of a method for controlling transaction concurrency according to the present disclosure.

Referring to FIG. 1, a flowchart of a method for controlling transaction concurrency is illustrated. The method may include the following steps:

Step S101, obtain a read operation for a target record, the read operation belongs to the first transaction, and the target record is a record created by the second transaction.

It can be understood that the database includes a number of records, and the target record is one of the number of records in the database.

The transaction includes a series of data operations, for example, the transaction includes a creation operation of a record 1 and a deletion operation of a record 2. The first transaction includes the read operation, the read operation is used to query or read the target record.

The target record is created by the second transaction, that is, the second transaction includes a create operation for creating the target record. The second transaction creates the target record by executing the create operation. In some embodiments, the create operation of the second transaction may be obtained first, and the create operation is used to create the target record; in response to the create operation, the record lock information is set to the first value, the state information is set to the third value, and the create version number is set to the unique identifier of the second transaction. At this time, the create version number is equal to the unique identifier of the second transaction.

Step S102, in response to the read operation, obtain the record header data of the target record, the record header data includes record lock information, state information, creation version number, and deletion version number, the record lock information is used to represent whether the target record is deleted, the state information is used to represent whether the target record is valid, the creation version number is used to represent the unique identifier of the transaction that creates the target record, and the deletion version number is used to represent the unique identifier of the transaction that deletes the target record.

It should be noted that in order to implement transaction concurrency control, the embodiment of the present disclosure adds an implicit record header data structure in front of each record in the database. The record header data structure may include a record lock, state, creation version number, and deletion version number. For example, the structure of the record header is shown in table 1 below.

TABLE 1

| Record lock | State | Creation version number | Deletion version number | Data area |
|---|---|---|---|---|

The value of the record lock is used to represent whether the record is deleted. For example, when the record is deleted, the record lock is set to 1, and when the record is not deleted, the record lock is set to 0.

The value of the state is used to represent whether the record is in a valid state or an invalid state. For example, when the record is valid, the value of the state is set to 1, and the physical storage space corresponding to the record stores valid record data; when the record is invalid, the value of the state is set to 0, and the physical storage space corresponding to the record is idle or recycled.

The creation version number is used to represent the unique identifier of the transaction that created the record. For example, if the transaction with the unique identifier 1 creates the record, then the creation version number of the record is 1.

The deletion version number is used to represent the unique identifier of the transaction that deleted the record. For example, if the transaction with the unique identifier 2 deletes the record, then the deletion version number of the record is 2.

It is understandable that the unique identifier of a transaction is usually the ID of the transaction. Each transaction may apply for a globally unique ID from the database system when it is created, and the database system may maintain a transaction ID sequence. The transaction ID sequence increments after each transaction application, during the entire life cycle of the database, it can be ensured that each transaction ID may not be repeated and increment in sequence. The life cycle of a transaction starts from creation and ends with transaction commit or transaction rollback.

The above record lock is a mutex lock, which can realize mutually exclusive access to critical resources. There is only one byte of mutex variable inside (that is, the value has only two states, 0 and non-0), which is defined as follows:

typedef volatile unsignedcharc_mutex_t;

The mutex locks have two operations of locking and unlocking: lock (c_mutex_t*) and unlock (c_mutex_t*). The function_sync_bool_compare_and_swap is used to implement the lock function. After the lock is completed, the value of c_mutex_t is non-0; the function_sync_lock_release is used to implement the lock release function, after the lock is released, the value of c_mutex_t is 0.

The record lock information is the value of the record lock, and the state information is the value of the status.

The embodiment of the present disclosure implements a transaction concurrency control scheme different from the existing one through the above-mentioned record header data, and can achieve the isolation level of reading committed transactions without the problem of dirty read.

Step S103, if the target record is determined to be in a valid state according to the state information, the target record is determined to be not deleted according to the record lock information, and the deletion version number is null, and the creation version number is not equal to the unique identifier of the first transaction, then determine whether the creation version number is in the transaction registration list.

After obtaining the record header data of the target record, the database system can determine whether the target record is visible to the first transaction based on the record header data. Whether the target record is visible to the transaction refers to whether the record can be displayed through a select operation.

In a specific application, if the state information is the third value, the target record is determined to be in the valid state; when the state information is the fourth value, the target record is determined to be in the invalid state. For example, the third value is 1, and the fourth value is 0 correspondingly.

If the record lock information is the first value, the target record is determined to not be deleted, if the record lock information is the second value, the target record is determined to be deleted. For example, the first value is 1 and the second value is 0. If the record is not deleted, the deletion version number is null.

If the creation version number is not equal to the unique identifier of the first transaction, it indicates that the target record is not created by the first transaction; if the creation version number is equal to the unique identifier of the first transaction, it indicates that the target record is created by the first transaction. At this time, the target record is created by the second transaction, the creation version number of the record header data of the target record is the unique identifier of the second transaction.

It is understandable that the database system maintains a transaction registration list, the transaction registration list records the information (e.g., key information such as transaction ID, creation time, and process to which it belongs) of all online transactions in the current database system. All transactions in the transaction registration list are online, that is, the transactions are not committed or rolled back. All transactions can be removed from the transaction registration list after being committed or rolled back. Therefore, whether a transaction has been committed or rolled back can be determined by determining whether the transaction in the transaction registration list.

Step S104, if the creation version number is not in the transaction registration list, read the target record.

Step S105, if the creation version number is in the transaction registration list, determine that the target record is unreadable to the first transaction.

It is understandable that if the creation version number is in the transaction registration list, it indicates that the second transaction has not been committed, and the target record is unreadable to the first transaction, that is, the target record is not visible to other transactions. Therefore, other transactions cannot read the target record.

If the creation version number is not in the transaction registration list, it indicates that the second transaction has been committed. The second transaction has been committed, which indicates that the target record is visible to other transactions and other transactions can read the target record. At this time, in response to the read operation on the target record, the target record is read.

In the embodiment of the present disclosure, based on the record lock information, state information, creation version number, and deletion version number in the record header data, it is determined that the target record is in a valid state, is not deleted and the deletion version number is null, and it is further determined whether the creation version number is in the transaction registration list. If the creation version number is in the transaction registration list, it indicates that the second transaction has not been committed, and the target record is unreadable to the first transaction. If the creation version number is not in the transaction registration list, it indicates that the second transaction has been committed, and the target record is readable to the first transaction, and the first transaction can read the target record. In this way, the transaction concurrency control of the database is implemented, and the transaction isolation level of the read committed level (ReadCommit) is implemented, and the dirty read problem cannot occur.

Based on any of the above embodiments, after obtaining the record header data of the target record, if it is determined according to the state information that the target record is in the valid state, it is determined according to the record lock information that the target record is deleted, the deletion version number is not null, and the deletion version number is not equal to the unique identifier of the first transaction, then it is further determined whether the creation version number and the deletion version number are in the transaction registration list. If the creation version number is not in the transaction registration list and the deletion version number is in the transaction list, the target record is read; if the creation version number is not in the transaction registration list and the deletion version number is not in the transaction list, it is determined that the target record is unreadable to the first transaction.

At this time, if the deletion version number is not null and is not equal to the unique identifier of the first transaction, it indicates that another transaction has deleted the target record. However, at this time, the target record is still in the valid state, so it is further determined whether the other transactions have committed the deletion operation. If other transactions have committed the deletion operation, then all transactions cannot read the target record, that is, the target record is invisible to all transactions. If other transactions have not committed the deletion operation, then other transactions except the transaction that deleted the target record can read the target record.

Whether the transaction is committed can be determined by determining whether the transaction is in the transaction registration list. At this time, since the deletion version number of the target record is not null, that is, other transactions can perform deletion operation on the target record, it indicates that the transaction that created the target record has been committed and the target record can be read by other transactions. Therefore, the creation version number is not in the transaction registration list.

Further, it is determined whether the deletion version number is in the transaction registration list. If the deletion version number is in the transaction registration list, it indicates that the transaction deleting the target record has not been committed, other transactions can still read the target record, and the first transaction can read the target record. If the deletion version number is not in the transaction registration list, it indicates that the transaction deleting the target record has been committed, and other transactions cannot read the target record.

In some embodiments, if it is determined according to the state information that the target record is in the invalid state, and it is determined according to the record lock information that the target record is deleted, then it is determined that the target record is unreadable to the first transaction.

It is understandable that, when the transaction deleting the target record is committed, the storage space of the target record is recycled by the system, the target record is truly deleted from the database system, and then the state is set to the fourth value to indicate that the target record is in the invalid state. Therefore, when it is determined that the target record is in the invalid state, it indicates that the target record has been deleted from the storage space, and all transactions cannot read the target record.

In other embodiments, if it is determined that the target record is in the valid state according to the state information, and it is determined that the target record is deleted according to the record lock information, the deletion version number is not null, and the deletion version number is equal to the unique identifier of the first transaction, then it indicates that the first transaction is the transaction that deletes the target record. At this time, the first transaction performs the deletion operation on the target record and then performs the above-mentioned read operation. Since the target record is still in the valid state and has not been truly deleted, the target record is readable to other transactions. However, for the first transaction, the target record is a deleted record and is unreadable, that is, it is determined that the target record is unreadable to the first transaction.

Figure 2:
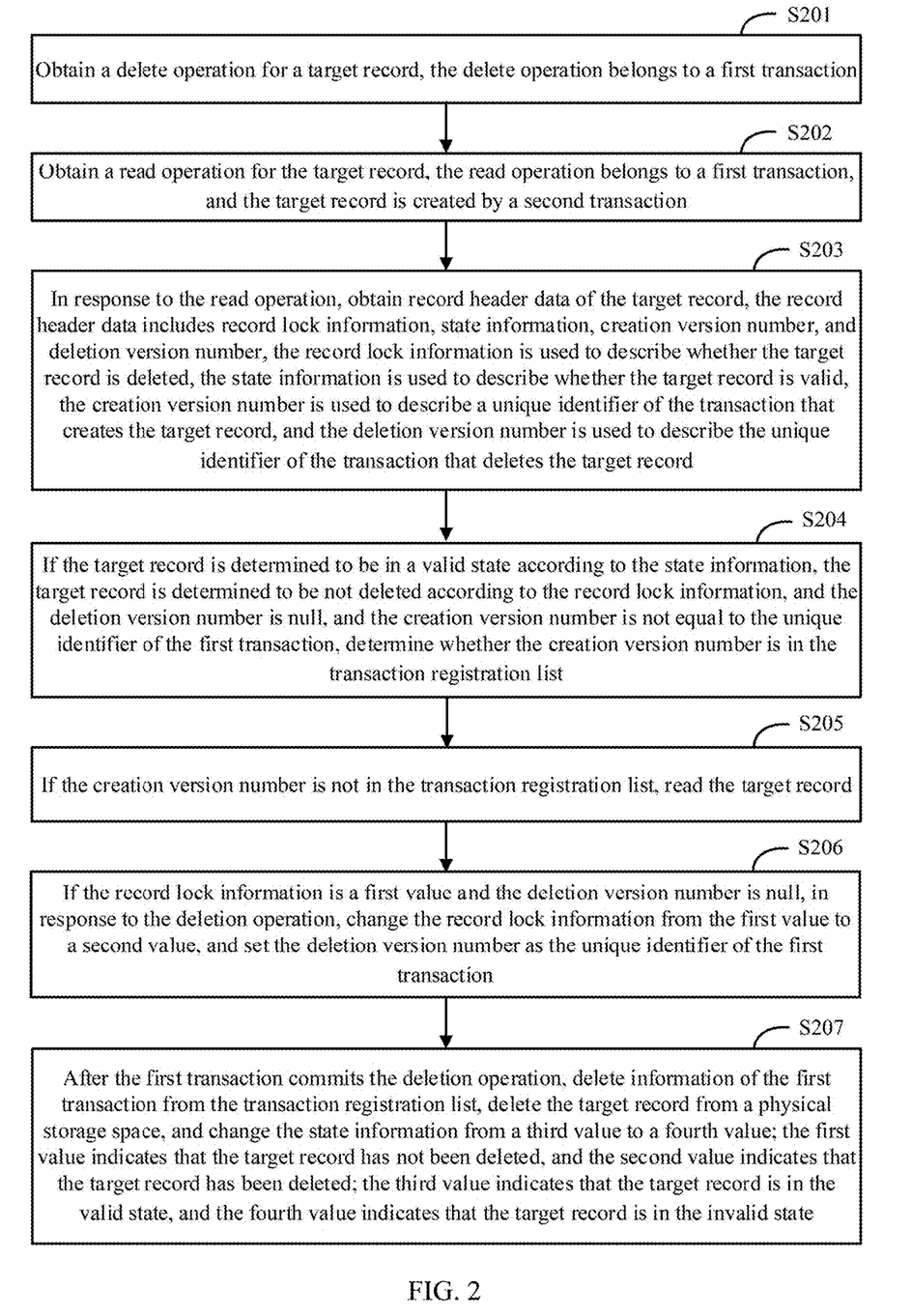
FIG. 2 is a flowchart of another embodiment of a method for controlling transaction concurrency according to the present disclosure.

Based on any of the above embodiments, referring to FIG. 2, another flowchart of a method for controlling transaction concurrency is provided, the method may include the following steps:

Step S201, obtain a deletion operation for the target record, the deletion operation belongs to the first transaction;

It can be understood that, before executing the deletion operation, the first transaction queries or reads the target record, that is, first performs the read operation on the target record to read the target record, and then deletes the target record.

Step S202: obtain the read operation for the target record, the read operation belongs to the first transaction and the target record is a record created by the second transaction.

Step S203, in response to the read operation, obtain the record header data of the target record, the record header data includes record lock information, state information, creation version number, and deletion version number, the record lock information is used to represent whether the target record is deleted, the state information is used to represent whether the target record is valid, the creation version number is used to represent the unique identifier of the transaction that creates the target record, and the deletion version number is used to represent the unique identifier of the transaction that deletes the target record.

Step S204: if the target record is determined to be in the valid state according to the state information, the target record is determined to be not deleted according to the record lock information, the deletion version number is null, and the creation version number is not equal to the unique identifier of the first transaction, then determine whether the creation version number is in the transaction registration list.

Step S205: if the creation version number is not in the transaction registration list, read the target record.

The relevant introduction of step S202~step S205 can be found above and is not repeated.

Step S206, if the record lock information is the first value and the deletion version number is null, in response to the deletion operation, change the record lock information from the first value to the second value, and set the deletion version number as the unique identifier of the first transaction.

After reading the target record, if the record lock information is the first value and the deletion version number is null, that is, the target record has not been deleted by other transactions, then the first transaction can apply for a record lock to delete the target record.

The record lock can prevent uncommitted transactions from deleting the same record repeatedly, that is, for a record, if the transaction 1 has performed the deletion operation on the record, the record lock information of the record is set to the second value. At this time, if the transaction 2 applies to delete the record, since the record lock information has been set to the second value, the transaction fails to apply for the record lock and cannot perform the deletion operation on the record, which can prevent repetitive deletions.

Step S207, after the first transaction commits the deletion operation, delete the information of the first transaction from the transaction registration list, delete the target record from the physical storage space, and change the state information from the third value to the fourth value; the first value indicates that the target record has not been deleted, and the second value indicates that the target record has been deleted; the third value indicates that the target record is in the valid state, and the fourth value indicates that the target record is in the invalid state.

When the first transaction deletes the target record, the first transaction changes the record lock information from the first value to the second value, and set the deletion version number as the unique identifier of the first transaction, then, after the first transaction is committed, the deletion operation takes effect and the target record is deleted from the physical storage space to actually delete the target record.

In other embodiments, if the record lock information is the second value and the deletion version number is not null, it indicates that the target record has been deleted by other transactions and cannot be deleted repeatedly by the first transaction, at this time, in response to the deletion operation, it is determined that the target record cannot be deleted by the first transaction, that is, the first transaction cannot delete the target record.

The embodiment of the present disclosure prevents repetitive deletion of records based on the record lock, state, creation version number, and deletion version number in the record header data.

In other embodiments, if there are failed operations in the transaction, the transaction is rolled back to undo all changes in the transaction and to roll back the changed records to the state before the transaction is created. For example, if there are failed operations in the first transaction, a rollback operation can be performed on the first transaction. At this time, the first transaction includes the deletion operation on the target record, and the deletion of the target record can be undone by the rollback operation. In detail, the undo log data of the first transaction is first obtained. The undo log data tracks and records the change content of each operation in the transaction, records which records are created in the current transaction, and which records are deleted in the current transaction, these records are used to roll back the transaction. Each transaction corresponds to an undo log. In the embodiment, the change operation of the first transaction includes the deletion operation on the target record, and the undo log data of the first transaction includes relevant information of the target record, based on the relevant information of the target record in the undo log data, the first transaction is rolled back to restore the deleted target record. In detail, according to the undo log data, the record lock information of the target record can be set to the first value, the deletion version number can be reset, the state information can be set to the third value, the creation version number can be set to the unique identifier of the second transaction, and the target record can be restored.

If the change operation of the first transaction further includes the creation operation, the record created by the first transaction is deleted in the rollback operation.

For example, after a transaction A creates a record 1 and deletes a record 2, the transaction A initiates a rollback request. The record 2 is created by a transaction C. At this time, the transaction A first creates the record 1 and then deletes the record 2, the undo operation in the rollback operation is performed in an opposite sequence, that is, the record 2 is restored first and then the record 1 is deleted. In detail, the record 2 is first restored, the record lock of the record 2 is reset, the deletion version number is cleared, and the record header data of the record 2 is exemplified as follows: the record lock is 0, the record state is 1, the creation version number is the ID of the transaction C, and the deletion version number is null; then the record 1 is deleted, the record lock of the record 1 is set to 1, and the deletion version number is set to the ID of the transaction A, at this time, the record header data of the record is exemplified as follows: the record lock is 1, the record state is 1, the creation version number is the ID of the transaction A, and the deletion version number is the ID of the transaction A. After all records in the undo log are undone, the information of the transaction A is removed from the transaction registration list.

After the rollback operation is performed, other transactions cannot query the record 1. It is assumed that a transaction B performs the query operation at this time, the record header data of the record 1 that can be queried is: the record lock is 1, the record state is 1, the creation version number is the ID of the transaction A, and the deletion version number is the ID of the transaction A; the transaction B extracts the creation version number and deletion version number of the record 1, and by querying the transaction registration list, determines that the transaction A that deletes the record 1 has been committed, and then determines that the record 1 is invisible.

For the record 1, there is another possibility, when the transaction A is rolled back, the database system may initiate a space recycle operation to recycle the storage space of the deleted records, and set the record state of the record to 0, which indicates that the record 1 is no longer in the database system. At this time, the transaction B cannot query the data of the record 1 from the storage level, and cannot query the record 1 at the transaction level. For the record 2, the record header data of the record 2 is exemplified as follows: the record lock is 0, the record state is 1, the creation version number is the ID of the transaction C, and the deletion version number is null; after the transaction B extracts the creation version number and deletion version number of the record 2, by querying the transaction registration list, the transaction B determines that the transaction C that creates the record 2 has been committed, and the deletion version number is null, then determines that the record 2 is visible to the transaction B.

It should be noted that in the database, record change operations include creating records (INSERT) and deleting records (DELETE).

There are two types of operations on records in the database: INSERT and DELETE, INSERT is creating records and DELETE is deleting records. For any record in the database, the record may be in any of the following states: creating, created, deleting, and deleted.

When the record is in the creating state, it indicates that the record is being created and the transaction that creates the record has not been committed. At this time, the record header data of the record can be exemplified in a table 2 as follows:

TABLE 2

| Record lock | State | Creation version number | Deletion version number |
|---|---|---|---|
| 0 | 1 | ID of a current transaction | |

The record being created is only visible to the transaction that created the record, not visible to other transactions. In other words, although the newly created record is already in the database, the newly created record has not yet taken effect because the transaction that created the record has not yet been committed.

When the record is in the created state, it indicates that the record has been created and the transaction that created the record has been committed. At this time, the record header data of the record can be exemplified as shown in the table 2. Since the transaction that created the record has been committed, the created record is visible to all transactions and the record has formally taken effect.

When the record is in the deleting state, it indicates that the record is being deleted and the transaction that deletes the record has not been committed. At this time, the record header data of the record can be exemplified in a table 3 as follows:

TABLE 3

| Record lock | State | Creation version number | Deletion version number |
|---|---|---|---|
| 1 | 1 | ID of a transaction creating the record | ID of a transaction deleting the record |

The record in the deleting state is not visible to the transaction that deleted the record, but the record is still visible to other transactions. At this time, the record is not actually deleted, the record lock is set to prevent other transactions from deleting the record repeatedly, and the deleted version of the record is set to the current transaction ID, so that the record is not visible to the current transaction, but the record is still visible to other transactions.

When the record is in the deleted state, it indicates that the record has been deleted and the transaction that deleted the record has been committed. At this time, when the record header data of the record is as shown in the table 3, the record is not visible to the current transaction, but is visible to other transactions. The record in the deleted state can have its storage space recycled by the database system. After the storage space is recycled, the record header data of the record can be shown in a table 4 as follows:

TABLE 4

| Record lock | State | Creation version number | Deletion version number |
|---|---|---|---|
| 1 | 0 | ID of a transaction creating the record | ID of a current transaction |

At this time, the state information is set to the invalid state, and the record is invisible to all transactions.

For example, there are currently transactions A, B, and C, the transactions A and B are online, that is, both the transactions A and B are still in the uncommitted state, and the information of the transactions A and B are still in the transaction registration list. The transaction C has been committed, that is, the information of transaction C is not in the transaction registration list.

A new record 1 is created in the transaction A. At this time, the record 1 is in the "creating" state, the record header data is as follows: the record lock is 0, the record state is 1, the creation version number is the ID of the transaction A, and deletion version number is null. At this time, the record 1 is only visible to the transaction A, and is not visible to the transaction B.

It can be understood that for the transaction B, although the record 1 already exists in the database system (i.e., the record state is 1), after the transaction B extracts the creation transaction ID from the "creation version number" of the record 1, by querying the system transaction registration list, the transaction B determines that transaction A is still online, that is, the transaction A has not been committed at this time, and other transactions cannot currently "found" the record created by transaction A, the record is not visible to other transactions.

The transaction A deletes another record 2 created in the transaction C, at this time, the record header data of the record 2 is as follows: the record lock is 1, the record state is 1, the creation version number is the ID of the transaction C, and the deletion version number is the ID of the transaction A. Since the record is in the "deleting" state, the record 2 is not visible in the transaction A, but the record 2 is still visible to the transaction B.

In the deletion operation, the transaction A deletes the record 2, the record is invisible to the transaction A, but for transaction B, the record is still in the database system (i.e., the record state is 1), so the transaction B can extract the "creation version number" and "deletion version number" of the record 2, and determine whether the deletion operation and creation operation have been committed by querying the transaction registration list. At this time, the transaction B determines that the transaction C that creates the record has been committed, and the transaction A that deletes the record 2 is still online and has not been committed, so the record 2 is determined to be visible.

It is understandable that the record is visible to the transaction B, but the record 2 has been deleted by the transaction A, the transaction B cannot delete the record 2, thereby preventing other transactions from performing repetitive deletion operations on the record 2.

It should be noted that after the transaction ends, when all operations in the transaction are completed, the transaction can be committed. After the transaction is committed, the information of the transaction in the transaction registration list can be removed, and all changes in the transaction can take effect, and the changes can be visible to other transactions.

For example, after creating the record 1 and deleting the record 2, the transaction A initiates a commit request. The database system first determines whether there are any failed records in the transaction A. If there are no failed records, the commit operation is allowed. When committing, the information of the transaction A is removed from the transaction registration list, and the changes in the transaction A are formal effective. After the transaction is committed, the database system can initiate a storage space recycle operation for the deleted record 2.

If the transaction B performs a query operation at this time, the record header data of the record 1 is queried as: the record lock is 0, the record state is 1, the creation version number is the ID of the transaction A, and the deletion version number is null. After extracting the creation version number and deletion version number of the record 1, by querying the transaction registration list, the transaction B determines that the transaction A that creates the record has been committed, and the record has not been set with a deletion version number, the transaction B determines that the record is visible to the transaction B.

For the record 2, after the transaction B performs a query operation, the record header data of the record 2 can be obtained as follows: the record lock is 1, the record state is 1, the creation version number is the ID of the transaction C, and the deletion version number is the ID of the transaction A. After extracting the creation version number and deletion version number of the record 2, by querying the transaction registration list, the transaction B determines that the transaction C that creates the record has been committed, and the transaction A that deletes the record has also been committed, so the transaction B determines that the record is not visible to the transaction B. For the record, there is another possibility, after the transaction A is committed, the database system can initiate a space recycle operation to recycle the storage space for those deleted records and set the record state to 0, it is indicated that the record 2 is no longer in the system. At this time, the transaction B cannot query the data of the record 2 from the storage level, and cannot find the record 2 at the transaction level.

In order to better understand the transaction concurrency control process, the following is an introduction with specific examples.

For example, it is assumed that there are 11 time sequences of read and write operations, and there are 7 transactions.

In the sequence 1, a first transaction with a transaction ID 1 creates a record 1, at this time, the record 1 is in the "creating" state, the record header data of the record 1 is shown in a following table 5.

TABLE 5

| Record lock | State | Creation version number | Deletion version number |
|---|---|---|---|
| 0 | 1 | 1 | |

At this time, the first transaction has not been committed, and the record 1 is only visible to the first transaction and not to other transactions.

In the sequence 2, the first transaction performs a query operation to read the record 1. At this time, since the record 1 is in the valid state, the creation version number is the ID of the first transaction, and the deletion version number is null, it indicates that the first transaction can read the record that it created but not committed.

In the sequence 3, a second transaction with a transaction ID 2 performs a read operation to read the record 1. At this time, the state of the record 1 is 1, the record 1 in the valid state, the creation version number is 1, which is less than the ID of the second transaction, and the deletion version number is null, then the second transaction further determines whether the first transaction is in the transaction registration list. Since the information of the first transaction still exists in the transaction registration list, it indicates that the first transaction has not been committed, so the record 1 is unreadable for the second transaction.

In the sequence 4, the first transaction performs a commit operation, the record 1 is formal effective, and the first transaction is deleted from the transaction registration list.

In the sequence 5, a third transaction with a transaction ID 3 performs a read operation to read the record 1. At this time, the record 1 is in a valid state, the creation version number is 1, and the deletion version number is null, the third transaction further determines that the first transaction does not exist in the transaction registration list, determines that the record is readable to the third transaction, and the record can be read by the third transaction.

In the sequence 6, a fourth transaction with a transaction ID 4 performs a deletion operation on the record 1. At this time, the fourth transaction reads the record 1 according to the process of the sequence 5; then the fourth transaction sets the deletion version number of the record 1 to 4, and sets the record lock to 1. After the setting, the record header data of the record 1 can be shown in the following table 6:

TABLE 6

| Record lock | State | Creation version number | Deletion version number |
|---|---|---|---|
| 1 | 1 | 1 | 4 |

At this time, the fourth transaction has not been committed, and the deletion operation has not taken effect. The state of the record 1 is 1, it is indicated that the record 1 has not been actually deleted, and other transactions can still read the record 1. However, the record lock is set to 1, that is, the record 1 is set by a deletion mark, other processes or transactions do not delete the record 1 repeatedly.

In the sequence 7, the fourth transaction performs a read operation on the record 1. At this time, since the deletion version number of the record is equal to the ID of the fourth transaction, it indicates that the current transaction deleted the record 1, and the record is unreadable to the current transaction.

In the sequence 8, a fifth transaction with a transaction ID 5 performs a read operation on the record 1. At this time, the record 1 is in the valid state, and the creation version number and the deletion version number are not equal to the current transaction ID 5, the fifth transaction further determines whether the transaction that creates the record 1, i.e., the first transaction, is committed, and whether the transaction that deletes the record 1, i.e., the fourth transaction, is committed. Since the first transaction has been committed and the fourth transaction has not been committed, the fifth transaction determines that the record 1 is readable to the fifth transaction, so the fifth transaction can read the record.

In the sequence 9, a sixth transaction with a transaction ID 6 performs a deletion operation on the record 1. At this time, since the record lock of the record is 1, the sixth transaction fails to apply for the record lock, so the record cannot be deleted.

In the sequence 10, the fourth transaction performs a commit operation, after the fourth transaction is committed, the information of the fourth transaction in the transaction registration list is deleted. The deletion operation of the fourth transaction formally takes effect, the database system actually deletes the record 1 from the data storage location, sets the record state to the invalid state, and clears the record lock. The record header data of the record 1 after the setting can be shown in the following table 7:

TABLE 7

| Record lock | State | Creation version number | Deletion version number |
|---|---|---|---|
| 0 | 0 | 1 | 4 |

In the sequence 11, a seventh transaction with a transaction ID 7 performs a read operation to read the record 1. At this time, since the record state of the record 1 is the invalid state, the record cannot be read.

It can be understood that the UPDATE operation in the database can be decomposed into the INSERT operation and the UPDATE operation, first, copy the record that is required to be modified and modify the relevant information, then, insert the modified data into the database as a new record, and then mark the original record as deleted, when the transaction is committed, the original record is actually deleted.

It should be understood that the serial numbers of the steps in the above embodiments does not mean the execution sequence, The execution sequence of each process should be determined by its function and internal logic, which should not constitute any limitation on the implementation process of the embodiments of the present disclosure.

Figure 3:
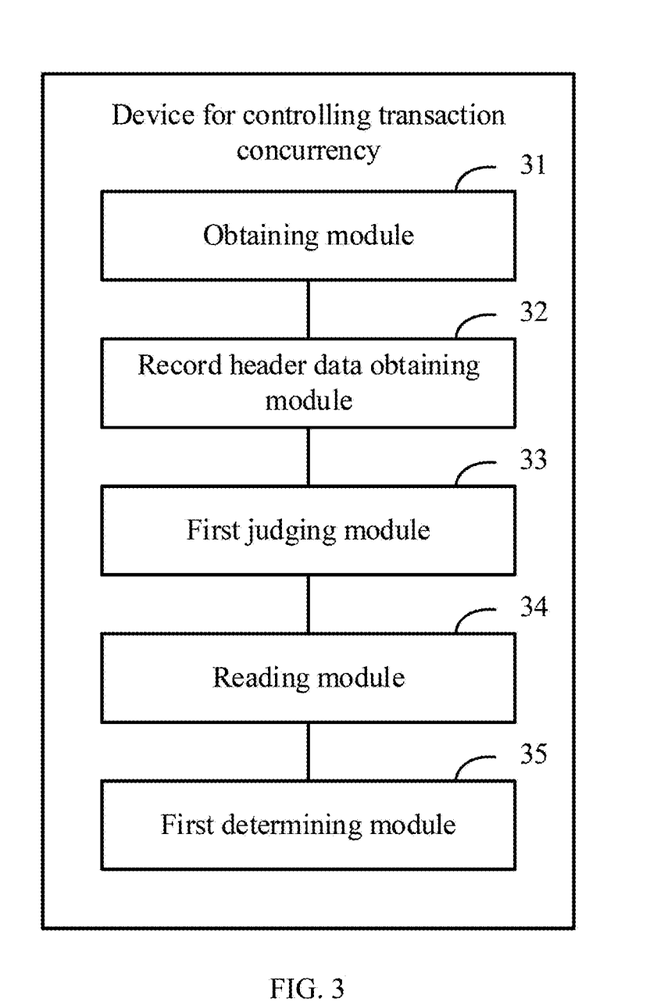
FIG. 3 is a schematic structural view of a device for controlling transaction concurrency according to the present disclosure.

Corresponding to the method for controlling transaction concurrency described in the above embodiment, FIG. 3 illustrates a schematic structural view of a device for controlling transaction concurrency according to the present disclosure, for illustrative purposes, only the part related to the embodiment of the present disclosure is shown.

Referring to FIG. 3, the device includes:

an obtaining module 31, is configured to obtain a read operation for a target record, the read operation belonging to a first transaction, and the target record being a record created by a second transaction;

a record header data obtaining module 32, is configured to in response to the read operation, obtain record header data of the target record, the record header data comprising record lock information, state information, a creation version number, and a deletion version number, the record lock information being used to represent whether the target record is deleted, the state information being used to represent whether the target record is valid, the creation version number being used to represent a unique identifier of a transaction that creates the target record, and the deletion version number being used to represent a unique identifier of a transaction that deletes the target record;

a first judging module 33, is configured to in response that the target record is determined to be in a valid state according to the state information, the target record is determined to be not deleted according to the record lock information, the deletion version number is null, and the creation version number is not equal to the unique identifier of the first transaction, determine whether the creation version number is in a transaction registration list;

a reading module 34, is configured to in response that the creation version number is not in the transaction registration list, read the target record; and a first determining module 35, is configured to in response that the creation version number is in the transaction registration list, determine that the target record is unreadable to the first transaction.

In some embodiments, the device further includes:

a second judging module, is configured to determine whether the creation version number and the deletion version number are in the transaction registration list if it is determined that the target record is in the valid state according to the state information, and the target record is deleted according to the record lock information, the deletion version number is not null, and the deletion version number is not equal to the unique identifier of the first transaction; if the creation version number is not in the transaction registration list and the deletion version number is in the transaction list, read the target record; if the creation version number is not in the transaction registration list and the deletion version number is not in the transaction list, determine that the target record is unreadable to the first transaction.

In some embodiments, the device further includes:

a second determining module, is configured to determine that the target record is unreadable to the first transaction if it is determined according to the state information that the target record is in the invalid state, and if it is determined according to the record lock information that the target record is deleted; if it is determined according to the state information that the target record is in the valid state, and if it is determined according to the record lock information that the target record is deleted, the deletion version number is not null, and the deletion version number is equal to the unique identifier of the first transaction, then determine that the target record is unreadable to the first transaction.

In some embodiments, the device further includes:

a first deleting module, is configured to obtain a deletion operation for the target record, the deletion operation belongs to the first transaction; if the record lock information is the first value and the deletion version number is null, then change the record lock information from the first value to the second value, and set the deletion version number as the unique identifier of the first transaction; after the first transaction commits the deletion operation, delete the information of the first transaction from the transaction registration list, delete the target record from the physical storage space, and change the state information from the third value to the fourth value; the first value indicates that the target record has not been deleted, and the second value indicates that the target record has been deleted; the third value indicates that the target record is in the valid state, and the fourth value indicates that the target record is in the invalid state.

In some embodiments, the device further includes:

a second deleting module, is configured to determine that the target record is undeletable to the first transaction in response to the deletion operation if the record lock information is the second value and the deletion version number is not null.

In some embodiments, the device further includes:

a creating module, is configured to obtain the creation operation of the second transaction, the creation operation is used to create the target record; in response to the creation operation, set the record lock information to the first value, set the state information to the third value, and set the creation version number to the unique identifier of the second transaction.

In some embodiments, the device further includes:

a rollback module, is configured to obtain a rollback operation of the first transaction; in response to the rollback operation, obtain undo log data of the first transaction; according to the undo log data, set the record lock information to the first value, clear the deletion version number, set the state information to the third value, set the creation version number to the unique identifier of the second transaction, and restore the target record.

It should be noted that the information interaction, execution process, etc. between the above-mentioned devices/units are based on the same concept as the method embodiment of the embodiment of the present disclosure. Their specific functions and technical effects can be found in the method embodiment and is not repeated.

Figure 4:
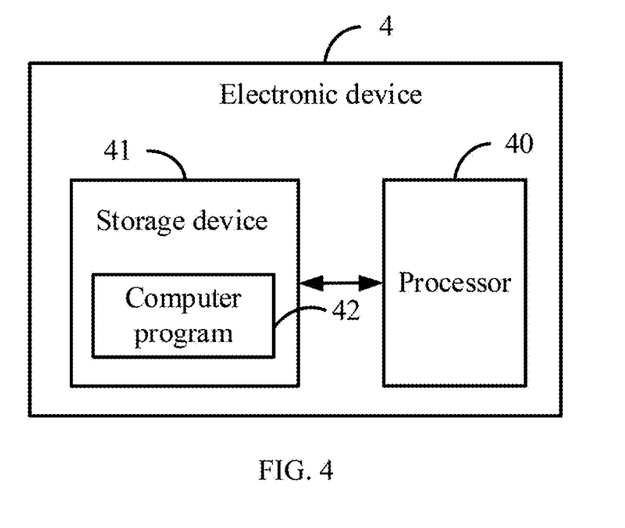
FIG. 4 is a schematic structural view of an embodiment of an electronic device according to the present disclosure.

FIG. 4 illustrates a schematic structural view of an electronic device according to the present disclosure. Referring to FIG. 4, the electronic device 4 includes: at least one processor (only one is shown) 40, a storage device 41, and a computer program 42 stored in the storage device and executable on the at least one processor, and when the processor performs the computer program 42, the steps in any of the above-mentioned method for controlling transaction concurrency are implemented.

The electronic device 4 may be a computing device such as a desktop computer, a notebook, a PDA, and a cloud server. The electronic device may include, but is not limited to, a processor 40 and a storage device 41. Those skilled in the art can understand that FIG. 4 is merely an example of the electronic device 4 and does not constitute a limitation on the electronic device 4, and may include more or fewer components than shown in the figure, or a combination of certain components, or different components, for example, may also include input and output devices, network access devices, etc.

The processor 40 may be a central processing unit (CPU), other general-purpose processors, digital signal processors (DSP), application-specific integrated circuits (ASIC), field-programmable gate arrays (FPGA) or other programmable logic devices, discrete gate or transistor logic devices, discrete hardware components, etc. A general-purpose processor may be a microprocessor or any conventional processor, etc.

In some embodiments, the storage device 41 may be an internal storage unit of the electronic device, such as a hard disk or storage device of the electronic device. In other embodiments, the storage device may also be an external storage device of the electronic device, such as a plug-in hard disk, a smart storage device card (SMC), a secure digital (SD) card, a flash card, etc. equipped on the electronic device. Further, the storage device may also include both an internal storage unit of the electronic device and an external storage device. The storage device is used to store an operating system, an application program, a boot loader, data, and other programs, such as the program code of the computer program. The storage device may also be used to temporarily store data that has been output or is to be output.

Those skilled in the art can clearly understand that for the convenience and simplicity of description, only the division of the above-mentioned functional units and modules is used as an example for illustration. In practical applications, the above-mentioned function allocation can be completed by different functional units and modules as needed, that is, the internal structure of the device can be divided into different functional units or modules to complete all or part of the functions described above. The functional units and modules in the embodiment can be integrated in a processing unit, or each unit can exist physically separately, or two or more units can be integrated in one unit. The above-mentioned integrated unit can be implemented in the form of hardware or in the form of software functional units. In addition, the specific names of the functional units and modules are only for the convenience of distinguishing each other, and are not used to limit the scope of protection of this application. The specific operating process of the units and modules in the above-mentioned system can refer to the corresponding process in the aforementioned method embodiment, which is not repeated.

The embodiment of the present disclosure further provides an electronic device, the electronic device includes: at least one processor, a storage device, and a computer program stored in the storage device and executable on the at least one processor, the processor implements the steps of any of the above-mentioned method embodiments when executing the computer program.

The embodiment of the present disclosure further provides a computer-readable storage medium, the computer-readable storage medium stores a computer program, and when the computer program is executed by a processor, the steps in the above-mentioned method embodiments can be implemented.

The embodiment of the present disclosure provides a computer program product, when the computer program product runs on an electronic device, the electronic device can implement the steps in the above-mentioned method embodiments when executing the computer program product.

If the integrated unit is implemented in the form of a software functional unit and sold or used as an independent product, it can be stored in a computer-readable storage medium. Based on this understanding, the present disclosure implements all or part of the processes in the above-mentioned embodiment method, which can be completed by instructing the relevant hardware through a computer program. The computer program can be stored in a computer-readable storage medium, and the computer program can implement the steps of the above-mentioned various method embodiments when executed by the processor. Among them, the computer program includes computer program code, and the computer program code can be in source code form, object code form, executable file or some intermediate form. The computer-readable medium may at least include: any entity or device that can carry the computer program code to the camera/terminal device, recording medium, computer storage device, read-only storage device (ROM), random access storage device (RAM), electric carrier signal, telecommunication signal and software distribution medium. For example, a USB flash drive, a mobile hard disk, a magnetic disk or an optical disk. In some jurisdictions, according to legislation and patent practice, computer-readable media cannot be electric carrier signals and telecommunication signals.

In the above embodiments, the description of each embodiment has its own emphasis, for parts that are not described or recorded in detail in a certain embodiment, reference can be made to the relevant descriptions of other embodiments.

Those skilled in the art can understand that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Professional and technical personnel can use different methods to implement the described functions for each specific application, but such implementation should not be considered to be beyond the scope of this application.

In the embodiments provided in the present disclosure, it should be understood that the disclosed devices, electronic devices and methods can be implemented in other ways. For example, the device/electronic device embodiments described above are merely schematic. For example, the division of the modules or units is only a logical function division. There may be other division methods in actual implementation, such as multiple units or components can be combined or integrated into another system, or some features can be ignored or not executed. Another point is that the mutual coupling or direct coupling or communication connection shown or discussed can be through some interfaces, indirect coupling or communication connection of devices or units, which can be electrical, mechanical or other forms.

The units described as separate components may or may not be physically separated, and the components shown as units may or may not be physical units, that is, they may be located in one place or distributed on multiple network units. Some or all of the units may be selected according to actual needs to achieve the purpose of the solution of this embodiment.

The embodiments described above are only used to illustrate the technical solutions of the present disclosure, rather than to limit them. Although the present disclosure has been described in detail with reference to the aforementioned embodiments, a person skilled in the art should understand that the technical solutions described in the aforementioned embodiments may still be modified, or some of the technical features may be replaced by equivalents. Such modifications or replacements do not deviate the essence of the corresponding technical solutions from the spirit and scope of the technical solutions of the embodiments of the present disclosure, and should all be included in the protection scope of the present disclosure.

The invention claimed is:

1. A method for controlling transaction concurrency, comprising:
　　creating a target record in response to a creation operation, and adding record header data comprising record lock information, state information, a creation version number, and a deletion version number for the target record, the record lock information being used to represent whether the target record is deleted, the state information being used to represent whether the target record is valid, the creation version number being used to represent a unique identifier of a transaction that creates the target record, and the deletion version number being used to represent a unique identifier of a transaction that deletes the target record;

obtaining a read operation for the target record, the read operation belonging to a first transaction, and the target record being a record created by a second transaction;

in response to the read operation, obtaining the record header data of the target record;

in response that the target record is in a valid state according to the state information, the target record is not deleted according to the record lock information, the deletion version number is null, and the creation version number is not equal to the unique identifier of the first transaction, determining whether the creation version number is in a transaction registration list;

in response that the creation version number is not in the transaction registration list, reading the target record; and in response that the creation version number is in the transaction registration list, determining that the target record is unreadable to the first transaction.

2. The method according to claim 1, after obtaining the record header data of the target record, further comprising:

in response that the target record is in the valid state according to the state information, the target record is deleted according to the record lock information, the deletion version number is not null, and the deletion version number is not equal to the unique identifier of the first transaction, determining whether the creation version number and the deletion version number are in the transaction registration list;

in response that the creation version number is not in the transaction registration list and the deletion version number is in the transaction list, reading the target record; and in response that the creation version number is not in the transaction registration list and the deletion version number is not in the transaction list, determining that the target record is unreadable to the first transaction.

3. The method according to claim 1, after obtaining the record header data of the target record, further comprising:

in response that the target record is in an invalid state according to the state information, and the target record is deleted according to the record lock information, determining that the target record is unreadable to the first transaction; and in response that the target record is in the valid state according to the state information, the target record is deleted according to the record lock information, the deletion version number is not null, and the deletion version number is equal to the unique identifier of the first transaction, determining that the target record is unreadable to the first transaction.

4. The method according to claim 1, before obtaining the read operation for the target record, further comprising:

obtaining a deletion operation for the target record, the deletion operation belonging to the first transaction;

after reading the target record, in response that the record lock information is a first value, and the deletion version number is null, in response to the deletion operation, changing the record lock information from the first value to a second value, and setting the deletion version number as the unique identifier of the first transaction;

after the first transaction commits the deletion operation, deleting information of the first transaction from the transaction registration list, deleting the target record from a physical storage space, and changing the state information from a third value to a fourth value;

the first value indicating that the target record has not been deleted, the second value indicating that the target record has been deleted, the third value indicating that the target record is in the valid state, and the fourth value indicating that the target record is in the invalid state.

5. The method according to claim 4, after obtaining the deletion operation for the target record, further comprising:

in response that the record lock information is the second value, and the deletion version number is not null, in response to the deletion operation, determining that the target record is undeletable to the first transaction.

6. The method according to claim 4, further comprising:

obtaining the creation operation of the second transaction, the creation operation being used to create the target record;

in response to the creation operation, setting the record lock information to the first value, setting the state information to the third value, and setting the creation version number to the unique identifier of the second transaction.

7. The method according to claim 4, after deleting the information of the first transaction from the transaction registration list, deleting the target record from the physical storage space, and changing the state information from the third value to the fourth value, further comprising:

obtaining a rollback operation of the first transaction;

in response to the rollback operation, obtaining undo log data of the first transaction;

according to the undo log data, setting the record lock information to the first value, clearing the deletion version number, setting the state information to the third value, setting the creation version number to the unique identifier of the second transaction, and restoring the target record.

8. A electronic device comprising:

at least one processor; and a storage device storing instructions, which when executed by the at least one processor, cause the at least one processor to:

create a target record in response to a creation operation, and add record header data comprising record lock information, state information, a creation version number, and a deletion version number for the target record, wherein the record lock information is used to represent whether the target record is deleted, the state information being used to represent whether the target record is valid, the creation version number is used to represent a unique identifier of a transaction that creates the target record, and the deletion version number is used to represent a unique identifier of a transaction that deletes the target record;

obtain a read operation for the target record, the read operation belonging to a first transaction, and the target record being a record created by a second transaction;

in response to the read operation, obtaining the record header data of the target record;

in response that the target record is in a valid state according to the state information, the target record is not deleted according to the record lock information, the deletion version number is null, and the creation version number is not equal to the unique identifier of the first transaction, determine whether the creation version number is in a transaction registration list;

in response that the creation version number is not in the transaction registration list, read the target record; and in response that the creation version number is in the transaction registration list, determine that the target record is unreadable to the first transaction.

9. The electronic device according to claim 8, wherein the at least one processor is further caused to:

in response that the target record is in the valid state according to the state information, the target record is deleted according to the record lock information, the deletion version number is not null, and the deletion version number is not equal to the unique identifier of the first transaction, determine whether the creation version number and the deletion version number are in the transaction registration list;

in response that the creation version number is not in the transaction registration list and the deletion version number is in the transaction list, read the target record; and in response that the creation version number is not in the transaction registration list and the deletion version number is not in the transaction list, determine that the target record is unreadable to the first transaction.

10. The electronic device according to claim 8, wherein the at least one processor is further caused to:

in response that the target record is in an invalid state according to the state information, and the target record is deleted according to the record lock information, determine that the target record is unreadable to the first transaction; and in response that the target record is in the valid state according to the state information, the target record is deleted according to the record lock information, the deletion version number is not null, and the deletion version number is equal to the unique identifier of the first transaction, determine that the target record is unreadable to the first transaction.

11. The electronic device according to claim 10, wherein the at least one processor is further caused to:

obtain a deletion operation for the target record, the deletion operation belonging to the first transaction;

after reading the target record, in response that the record lock information is a first value, and the deletion version number is null, in response to the deletion operation, change the record lock information from the first value to a second value, and set the deletion version number as the unique identifier of the first transaction;

after the first transaction commits the deletion operation, delete information of the first transaction from the transaction registration list, delete the target record from a physical storage space, and change the state information from a third value to a fourth value;

the first value indicating that the target record has not been deleted, the second value indicating that the target record has been deleted, the third value indicating that the target record is in the valid state, and the fourth value indicating that the target record is in the invalid state.

12. The electronic device according to claim 11, wherein the at least one processor is further caused to:

in response that the record lock information is the second value, and the deletion version number is not null, in response to the deletion operation, determine that the target record is undeletable to the first transaction.

13. The electronic device according to claim 11, wherein the at least one processor is further caused to:

obtain the creation operation of the second transaction, the creation operation being used to create the target record;

in response to the creation operation, set the record lock information to the first value, set the state information to the third value, and set the creation version number to the unique identifier of the second transaction.

14. The electronic device according to claim 11, wherein the at least one processor is further caused to:

obtain a rollback operation of the first transaction;

in response to the rollback operation, obtain undo log data of the first transaction;

according to the undo log data, set the record lock information to the first value, clear the deletion version number, set the state information to the third value, set the creation version number to the unique identifier of the second transaction, and restore the target record.

15. A readable storage medium having stored thereon instructions that, when executed by a processor of an electronic device, causes the processor to perform a method for controlling transaction concurrency, the method comprising:

creating a target record in response to a creation operation, and adding record header data comprising record lock information, state information, a creation version number, and a deletion version number for the target record, the record lock information being used to represent whether the target record is deleted, the state information being used to represent whether the target record is valid, the creation version number being used to represent a unique identifier of a transaction that creates the target record, and the deletion version number being used to represent a unique identifier of a transaction that deletes the target record;

obtaining a read operation for the target record, the read operation belonging to a first transaction, and the target record being a record created by a second transaction;

in response to the read operation, obtaining the record header data of the target record;

in response that the target record is in a valid state according to the state information, the target record is not deleted according to the record lock information, the deletion version number is null, and the creation version number is not equal to the unique identifier of the first transaction, determining whether the creation version number is in a transaction registration list;

in response that the creation version number is not in the transaction registration list, reading the target record; and in response that the creation version number is in the transaction registration list, determining that the target record is unreadable to the first transaction.

16. The readable storage medium according to claim 15, after obtaining the record header data of the target record, the method further comprises:

in response that the target record is in the valid state according to the state information, the target record is deleted according to the record lock information, the deletion version number is not null, and the deletion version number is not equal to the unique identifier of the first transaction, determining whether the creation version number and the deletion version number are in the transaction registration list;

in response that the creation version number is not in the transaction registration list and the deletion version number is in the transaction list, reading the target record; and in response that the creation version number is not in the transaction registration list and the deletion version number is not in the transaction list, determining that the target record is unreadable to the first transaction.

17. The readable storage medium according to claim 15, after obtaining the record header data of the target record, the method further comprises:

in response that the target record is in an invalid state according to the state information, and the target record is deleted according to the record lock information, determining that the target record is unreadable to the first transaction; and in response that the target record is in the valid state according to the state information, the target record is deleted according to the record lock information, the deletion version number is not null, and the deletion version number is equal to the unique identifier of the first transaction, determining that the target record is unreadable to the first transaction.

18. The readable storage medium according to claim 17, before obtaining the read operation for the target record, the method further comprises:

obtaining a deletion operation for the target record, the deletion operation belonging to the first transaction;

after reading the target record, in response that the record lock information is a first value, and the deletion version number is null, in response to the deletion operation, changing the record lock information from the first value to a second value, and setting the deletion version number as the unique identifier of the first transaction;

after the first transaction commits the deletion operation, deleting information of the first transaction from the transaction registration list, deleting the target record from a physical storage space, and changing the state information from a third value to a fourth value;

the first value indicating that the target record has not been deleted, the second value indicating that the target record has been deleted, the third value indicating that the target record is in the valid state, and the fourth value indicating that the target record is in the invalid state.

19. The readable storage medium according to claim 18, after obtaining the deletion operation for the target record, the method further comprises:

in response that the record lock information is the second value, and the deletion version number is not null, in response to the deletion operation, determining that the target record is undeletable to the first transaction.

20. The readable storage medium according to claim 18, the method further comprises:

obtaining the creation operation of the second transaction, the creation operation being used to create the target record;

in response to the creation operation, setting the record lock information to the first value, setting the state information to the third value, and setting the creation version number to the unique identifier of the second transaction.

* * * * *